United States Patent [19]

Mitsui et al.

[11] Patent Number: 5,559,617
[45] Date of Patent: Sep. 24, 1996

[54] LIQUID CRYSTAL DISPLAY DEVICE WITH OVERLAPPING COMPENSATORS WITH PORTIONS HAVING DIFFERENT RETARDATION VALUES

[75] Inventors: Seiichi Mitsui, Nara; Kozo Nakamura, Kashiba, both of Japan

[73] Assignee: Sharp Kabushiki Kaisha, Osaka, Japan

[21] Appl. No.: 281,004

[22] Filed: Jul. 27, 1994

[30] Foreign Application Priority Data

Jul. 30, 1993 [JP] Japan .................................. 5-190500

[51] Int. Cl.$^6$ ........................ G02F 1/1347; G02F 1/1335
[52] U.S. Cl. ................................................ 359/73; 359/53
[58] Field of Search ........................................ 359/73, 53

[56] References Cited

U.S. PATENT DOCUMENTS

| | | | |
|---|---|---|---|
| 4,917,465 | 4/1990 | Conner et al. | 359/53 |
| 4,984,874 | 1/1991 | Yamamoto et al. | 359/73 |
| 5,126,868 | 6/1992 | Kizaki et al. | 359/73 |
| 5,157,529 | 10/1992 | Koopman et al. | 359/73 |
| 5,179,457 | 1/1993 | Hirataka et al. | 359/73 |
| 5,182,665 | 1/1993 | O'Callaghan et al. | 359/95 |
| 5,184,237 | 2/1993 | Iimura et al. | 359/63 |
| 5,193,020 | 3/1993 | Shiozaki et al. | 359/73 |
| 5,237,438 | 8/1993 | Miyashita et al. | 359/73 |
| 5,311,339 | 5/1994 | Fertig et al. | 359/73 |

FOREIGN PATENT DOCUMENTS 557110  8/1993  European Pat. Off. .

OTHER PUBLICATIONS

"Kogaku", T. Motohiro et al., vol. 19, p. 93, 1990.
"Handbook Of Liquid Crystal Device", 142nd Committee of Japan Society for the Promotion of Science, pp. 329–352(1989).
"640×400 Pixels Multicolor STN–LCD Using Birefringence Effect", Iijima et al., Japan Display '89, pp. 300–302.

*Primary Examiner*—Anita Pellman Gross
*Assistant Examiner*—Toan Ton

[57] ABSTRACT

A liquid crystal display device which includes a first substrate and a second substrate, a liquid crystal layer sandwiched between the first and second substrates, electrodes for applying an electric field to the liquid crystal layer to control a retardation of the liquid crystal layer, a plurality of pixels, and at least one polarizer disposed outside of the first substrate, wherein the first substrate positioned between the polarizer and the liquid crystal layer includes an optical phase compensation means which includes a first region having a first retardation and a second region having a second retardation, whereby a color of emitted light from each of the plurality of regions is selected to be a specific one, in accordance with the retardations of the optical phase compensation means and the retardation of the liquid crystal layer.

13 Claims, 17 Drawing Sheets

LIQUID CRYSTAL DISPLAY DEVICE WITH OVERLAPPING COMPENSATORS WITH PORTIONS HAVING DIFFERENT RETARDATION VALUES

BACKGROUND OF THE INVENTION

1. Field of the Invention

The present invention relates to a liquid crystal display device, and more particularly to a color liquid crystal display device. The invention relates also to a method for producing the liquid crystal display device.

2. Description of the Related Art

Recently, applications of a liquid crystal display device to a word processor, a note-type personal computer, a portable television receiver called a pocket TV, or the like have rapidly been increased.

In a liquid crystal display device, conventionally, a TN (twisted nematic) mode, or an STN (super twisted nematic) mode has been used. When the former, or the TN mode is employed, a liquid crystal display element is disposed between one set of polarizers, and a monochromatic display is conducted by using optical characteristics of the liquid crystal display element, i.e., the optical rotary characteristics appearing when no voltage is applied, and the polarization dissolution characteristics appearing when a voltage is applied.

In contrast, the latter, or the STN mode is a liquid crystal display structure which is similar to the TN mode and widely used in a display device for a word processor. In the STN mode, the twist angle of a liquid crystal layer of the liquid crystal display is set between 180 to 270 deg. The STN mode is characterized in that the twist angle of the liquid crystal layer is increased by 90 deg. or more and the angle of polarization axes of the polarizers are optimized, so that a sudden change in molecular orientation due to a voltage application influences the change in birefringence of the liquid crystal layer, thereby realizing electro-optical characteristics having a sharp threshold. Accordingly, the STN mode is suitable for a simple matrix driving system. On the other hand, the STN mode has a drawback that the background of a display is colored in yellow-green or dark blue because of the birefringence of the liquid crystal. In order to eliminate this drawback, a liquid crystal display element has been proposed in which color compensation is made by stacking an STN display panel with an optical phase compensation plate, or a phase difference panel made of a polymer such as polycarbonate, thereby attaining a monochromatic display. At present, a liquid crystal display element of this structure is commercially available as a so-called paper white LCD.

When a color display is to be done, microcolor filters of, for example, red, blue and green are disposed for each pixel of a liquid crystal display element of the TN mode which can conduct a monochromatic display as described above, or that of the STN mode in which color compensation is made, and a multicolor or full color display is conducted in accordance with the additive color mixing by using the optical switching characteristics. At present, a liquid crystal display device which can conduct such a color display is used as a display device for a portable apparatus such as a so-called liquid crystal television receiver or a laptop computer in which an active-matrix driving system or a simple matrix driving system is employed.

As a coloring system for a liquid crystal display device of the STN mode, a multicolor display method in which a multicolor display is conducted by applying a voltage to a compensation layer of Double Layer Super Twisted Nematic (DSTN) to control compensation conditions as been proposed (C. Iijima et al., JAPAN DISPLAY '89, p. 300).

Other color display methods are those according to the interference color method and including a so-called ECB (electrically controlled birefringence) mode, a DAP (deformation of vertical aligned phase) mode, and a HAN (hybrid-aligned nematic) mode. These modes use the birefringence of a liquid crystal molecule. A liquid crystal display device of such a mode is so structured that polarizers are respectively disposed on the both sides of a liquid crystal cell having a liquid crystal layer in which nematic liquid crystal molecules are aligned in a specified direction with respect to a substrate. When a voltage is applied to the liquid crystal layer, the initial orientation of the molecules is changed to cause a change in anisotropy of refractive index, and therefore the color of light passing through the liquid crystal layer is changed to conduct a color display.

The display modes of TN, STN, ECB, DAP and HAN are well known techniques and their operation principles are described in the "HANDBOOK OF LIQUID CRYSTAL DEVICE", the 142nd committee of Japan Society for the Promotion of Science, 1989, pp. 329–352.

When a color display is to be conducted in a liquid crystal display device of the TN mode or the STN mode, it is required to use a color filter as described above. This causes a problem as follows. When color filters of three colors are used, for example, at least ⅔ of light of the visible region is absorbed, and about half of the light is absorbed by polarizers which are disposed in the vicinity of the liquid crystal panel, resulting in that the total reflectance of the whole of the panel is reduced to 15% or less, whereby causing a problem that the display is very dark.

In a color liquid crystal display device such as ECB, or DAP using the interference color, colors to be shown can be changed depending on an applied voltage. However, the range of an applied voltage is very narrow so that even a small variation in the applied voltage causes the hue to be changed. Furthermore, the number of colors which can be used in the display is limited.

SUMMARY OF THE INVENTION

The liquid crystal display device of this invention includes a first substrate and a second substrate, a liquid crystal layer sandwiched between the first and the second substrates, electrodes for applying an electric field to the liquid crystal layer to control retardation of the liquid crystal layer, a plurality of pixels, and at least one polarizer disposed outside of the first substrate, wherein the first substrate positioned between the polarizer and the liquid crystal layer includes an optical phase compensation means which includes a first region having a first retardation and a second region having a second retardation, whereby a color of emitted light from each of the first and the second regions is selected to be a specific one, in accordance with the retardations of the optical phase compensation means and the retardation of the liquid crystal layer.

In one embodiment of the invention, each of the plurality of pixels includes a portion of one of the first and the second regions.

In another embodiment of the invention, each of the plurality of pixels includes each portion of the first and the second regions.

In still another embodiment of the invention the optical phase compensation means further includes a third region having a third retardation, and each of the plurality of pixels includes a portion of at least one of the first, the second and the third regions.

In still another embodiment of the invention the first and the second regions are arranged regularly in two dimension.

In still another embodiment of the invention, the retardation of the liquid crystal layer is equal to or less than 1.0 μm.

In still another embodiment of the invention, the second substrate includes a light reflecting means on a side of the liquid crystal layer.

In still another embodiment of the invention, the light reflecting means functions as one of the electrodes for applying an electric field to the liquid crystal layer.

In another aspect of the invention, a method for fabricating a liquid crystal display device which includes a first substrate and a second substrate, a liquid crystal layer sandwiched between the first and the second substrates, electrodes for applying an electric field to the liquid crystal layer to control retardation of the liquid crystal layer, a plurality of pixels and, at least one polarizer disposed outside of the first substrate is provided, the method including: a step of forming an optical phase compensation means which includes a first region having a first retardation and a second region having a second retardation by using an oblique evaporation method on the first substrate.

In one embodiment of the invention, the step of forming the optical phase compensation means includes: a step of forming a first optical phase compensation means on the first substrate correspondingly to a desired portion of each of the plurality of pixels; and a step of forming a second optical phase compensation means over the first substrate.

Thus, the invention described herein makes possible the advantages of (1) providing a liquid crystal display device which has a high display quality and can conduct a bright color display without using a color filter, and (2) providing a method of fabricating the liquid crystal display device.

These and other advantages of the present invention will become apparent to those skilled in the art upon reading and understanding the following detailed description with reference to the accompanying figures.

DESCRIPTION OF THE PREFERRED EMBODIMENTS

Figure 1:
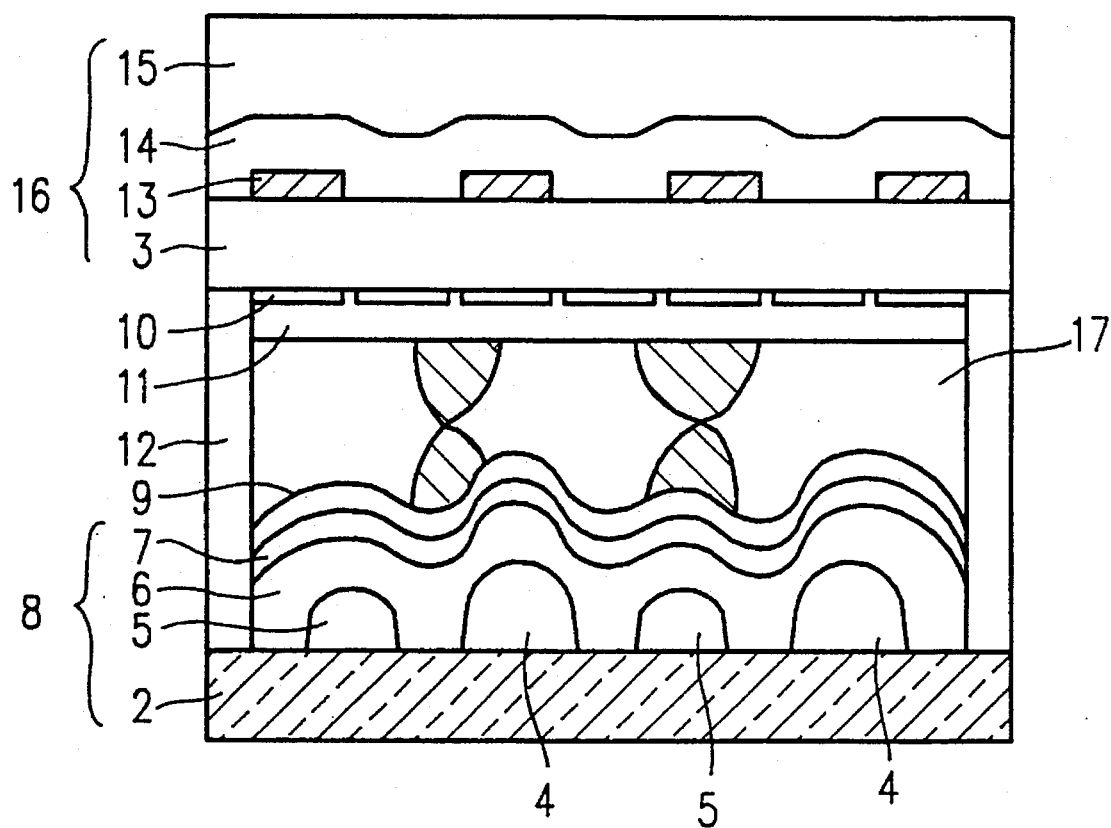
FIG. 1 is a section view of a liquid crystal display device of Example 1.

Hereinafter, the display principle of the liquid crystal display device of the invention will be described by illustrative examples.

For example, a homogeneous cell which uses a liquid crystal with anisotropy of refractive index of $\Delta n_1$ and has a thickness of $d_1$, and an optical phase compensation member (anisotropy of refractive index: $\Delta n_2$, and thickness: $d_2$) are disposed between two polarizers in such a manner that the slower optic axis of a liquid crystal molecule is perpendicular to that of the optical phase compensation member. In this arrangement, when linearly polarized light which has passed through one of the polarizers passes through the optical phase compensation member and the liquid crystal layer, the phase difference δ is expressed as:

$$\delta = (2\pi/\lambda)(\Delta n_1 d_1 - \Delta n_2 d_2) \quad (1)$$

where λ indicates a wavelength, $\Delta n_1 d_1$ the retardation of the liquid crystal layer, $\Delta n_2 d_2$ the retardation of the optical phase compensation plate, $\Delta n_1$ and $\Delta n_2$ the refractive indices of the layer and the plate, and $d_1$ and $d_2$ the thicknesses of the layer and the plate.

When the angle formed by the director (the direction of the major axis) of a liquid crystal molecule and the polarization axis of the polarizer is set to 45 deg., and the polarization axes of the two polarizers are perpendicular to each other, the transmitted light intensity $I\perp$ is expressed as:

$$\begin{aligned} I\perp &= A^2 \sin^2(\delta/2) \\ &= A^2 \sin^2\{(\pi/\lambda)(\Delta n_1 d_1 - \Delta n_2 d_2)\}. \end{aligned} \quad (2)$$

From the above, it will be noted that, when white monochromatic light is used, the transmitted light intensity depends on the retardation and various hues which are shown. When a voltage is applied to the liquid crystal cell, the effective anisotropy of refractive index of the cell changes together with the orientation of liquid crystal molecules.

In contrast, when the polarization axes of the two polarizers are parallel to each other, the transmitted light intensity $I_{//}$ is expressed as:

$$I_{//} = A^2\cos^2(\delta/2) \quad (3)$$
$$= A^2\cos^2\{(\pi/\lambda)(\Delta n_1 d_1 - \Delta n_2 d_2)\}.$$

From Eqs. (2) and (3), it will be noted that a color shown in the crossed Nicols state and that shown in the parallel Nicols state are complementary to each other.

When the polarizer at the back of the cell is replaced with a reflection plate so as to constitute a reflective liquid crystal cell, the reflected light intensity R is indicated as:

$$R = A^2\{(\cos\delta/2)^2 - (\sin\delta/2)^2\}^2 \quad (4)$$
$$= A^2\{(\cos\pi(\Delta n_1 d_1 - \Delta n_2 d_2)/\lambda)^2 -$$
$$(\sin\pi(\Delta n_1 d_1 - \Delta n_2 d_2)/\lambda)^2\}^2.$$

In Eq. (4), it is assumed that the reflection plate conducts perfect reflection. The wavelength dependence of the reflected light intensity R was obtained from Eq. (4) in the cases where, for example, $\Delta n_1 d_1 - \Delta n_2 d_2$ is 330 nm, 360 nm, 470 nm and 530 nm. Results are shown in FIGS. 12 to 15. In these calculations, it was assumed that the value of $\Delta n_1 d_1 - \Delta n_2 d_2$ does not depend on the wavelength.

As seen from FIGS. 12 to 15, red is shown in the case of 330 nm, purple in the case of 360 nm, blue in the case of 470 nm, and green in the case of 530 nm. From this, it will be noted that, when a light source of white light is used, the reflected light intensity depends on the retardation based on the same principle as that of a transmissive liquid crystal display device. Therefore, various hues are display by a reflective liquid crystal display. When a voltage is applied, the retardation of the liquid crystal layer changes. Consequently, the color of reflected light can be controlled by a voltage.

When one display pixel is divided into two or three regions having different phase differences of the above Eq. (1), by additively mixing interference colors based on the display principles expressed by the above Eqs. (2) to (4), colors of a further increased number of kinds can be displayed.

Hereinafter, examples of the invention will be described specifically.

EXAMPLE 1

Figure 2:
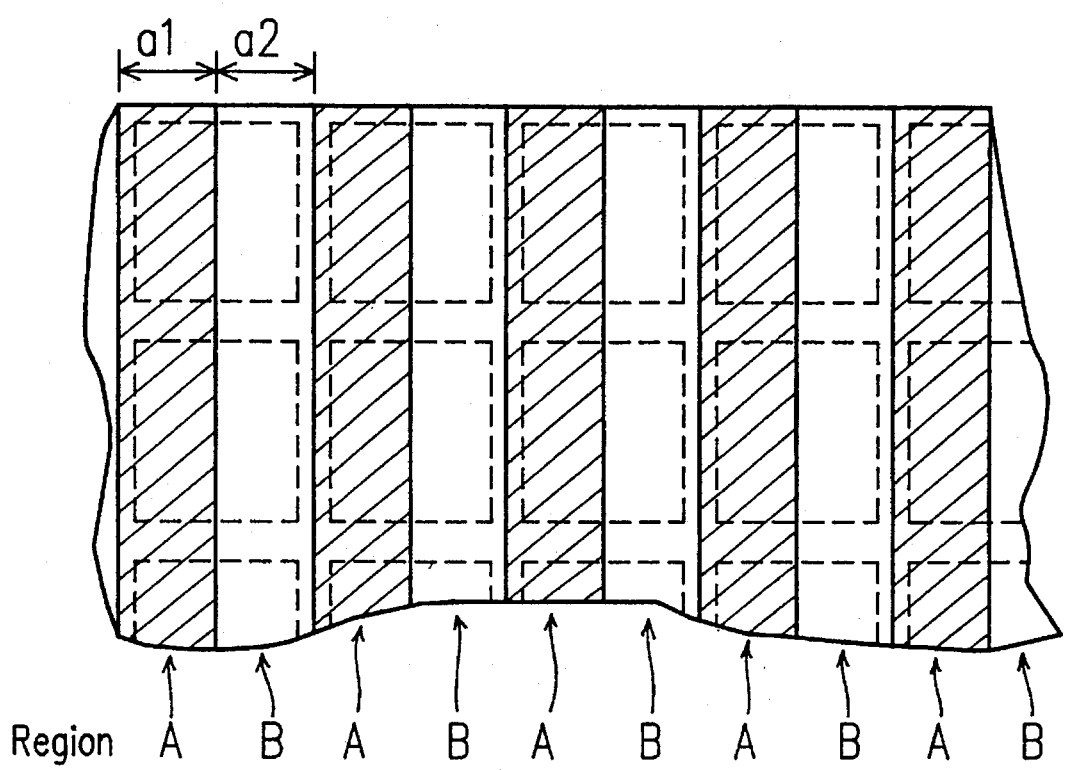
FIG. 2 is a plan view of an upper substrate of the liquid crystal display device shown in FIG. 1.
Figure 3:
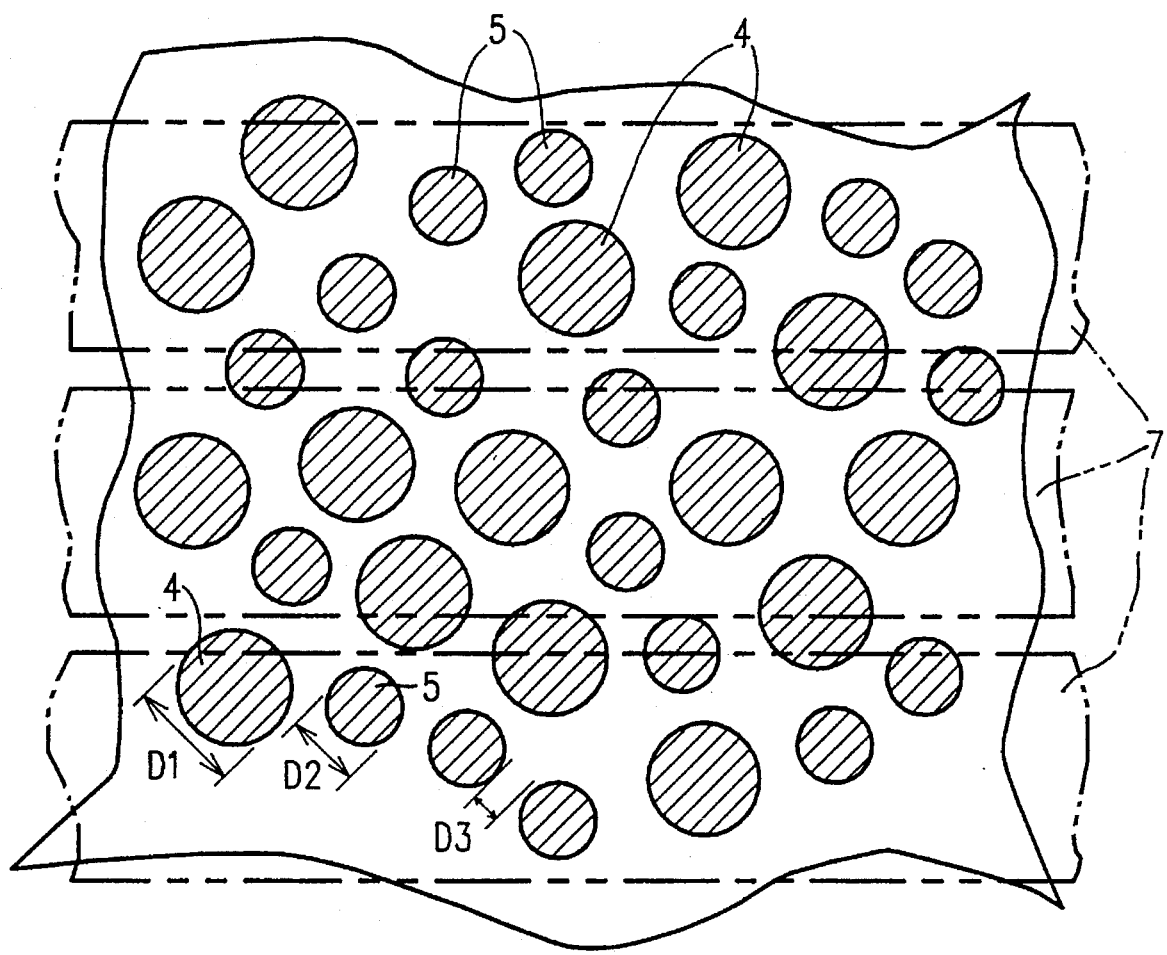
FIG. 3 is a plan view of a reflection substrate of the liquid crystal display device shown in FIG. 1.

FIG. 1 is a section view of a liquid crystal display device of Example 1, FIG. 2 is a plan view of an upper substrate, and FIG. 3 is a plan view of a lower substrate of the liquid crystal display. The liquid crystal display device includes a pair of the lower substrate 8 and the upper substrate 16 which are opposed to each other with a liquid crystal layer 17 therebetween. In the lower substrate 8, a number of large projections 4 and small projections 5 which are made of a synthetic resin material described later are formed on a glass substrate 2. As shown in FIG. 3, the diameters D1 and D2 of the bottoms of the large projections 4 and small projections 5 are set to, for example, 10 μm and 5 μm, respectively. Spaces D3 between these projections are set to, for example, at least 2 μm or more. A planarization film 6 is formed so as to cover the projections 4 and 5 and fill recesses between the projections 4 and 5. Reflection films 7 made of a metal material such as aluminum, nickel, chromium, silver, gold or the like are formed on the planarization film 6. The reflection films 7 function also as reflection pixel electrodes. As shown in FIG. 3, the reflection films 7 are formed into plural strips which elongate in parallel and in the lateral direction in FIG. 3. The projections 4 and 5, the planarization film 6, and the reflection films 7 which are formed on the glass substrate 2 constitute a reflection plate functioning as the light reflection member. An alignment film 9 is formed on the reflection films 7.

The upper substrate 16 includes a glass substrate 3 which opposes the glass substrate 2. Plural transparent electrodes 10 which are made of ITO (indium tin oxide) or the like are formed on the surface of the glass substrate 3 on the side of the liquid crystal layer 17 so as to be formed into plural strips which elongate in a direction perpendicular to the longitudinal direction of the reflection films 7. An alignment film 11 covers the glass substrate 3 on which the transparent electrodes 10 are formed. As shown in FIG. 1, first and second optical phase compensation members 13 and 14 are formed on the surface of the glass substrate 3 which is opposite the surface in contact with the liquid crystal layer 17. By the first and second optical phase compensation members 13 and 14, as shown in FIG. 2, at least two kinds of regions A and B having different retardations are formed. The regions A and B are arranged in a regularly repeated manner so as to form pixels. The size of each region corresponds to the pixel electrode or the reflection film 7. As an example, portions of the stripe-like regions A and B are included within one pixel. Areas indicated by broken lines in FIG. 2 correspond to pixels, respectively. Furthermore, a polarizer 15 is disposed on the thus configured upper substrate 16.

A sealant 12 which will be described later is applied at the peripheral portions of the glass substrates 2 and 3 which oppose to each other as described above, thereby sealing the space between the substrates. As the liquid crystal layer 17 sealed between the alignment films 9 and 11, for example, ZLI4427 (trade name) produced by Merck & Co., Inc. is used. The thus configured liquid crystal display device of the example is subjected to a multiplex driving.

FIGS. 4A to 4F are section views illustrating a method of producing the upper substrate 16 shown in FIG. 1.

Figure 4A:
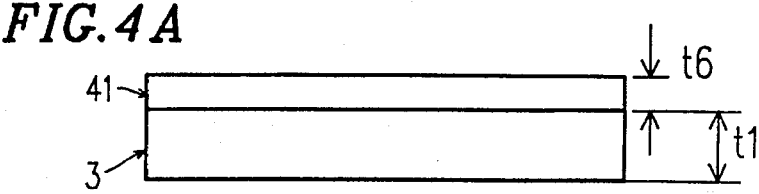
FIGS. 4A to 4F are section views illustrating the processes of producing the upper substrate of the liquid crystal display device shown in FIG. 1.

In the example, as shown in FIG. 4A, a glass substrate (trade name: 7059) which is produced by Corning Inc. and has a thickness $t_1$ of 1.1 mm was used as the glass substrate 3. A photosensitive material (such as OFPR800 (trade name) produced by Tokyo Ohka Kogyo Co., Ltd.) is spin-coated onto the glass substrate 3 at 500 to 3,000 r.p.m., to form a resin layer 41. In the example, the process of spin-coating the photosensitive material is conducted at 2,500 r.p.m. for 30 sec., thereby forming the resin film 41 of a thickness $t_6$ of, for example, 1.5 μm.

Figure 4B:
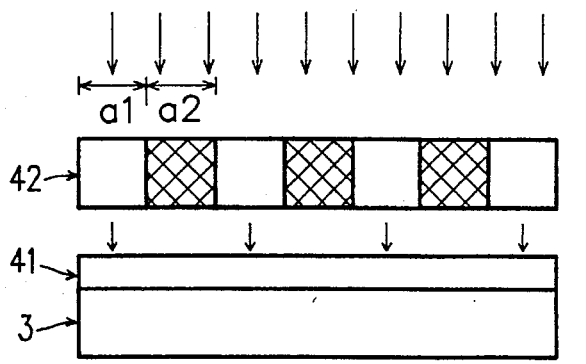
Figure 4C:
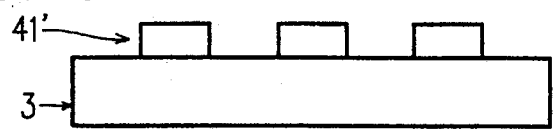

Next, the substrate on which the resin film 41 is formed is baked in an atmosphere of 90° C. for 30 min. Then, as shown in FIG. 4B, a photomask 42 in which a number of stripe-like patterns corresponding to the size of pixels described later are formed is placed above the resin film 41 and an exposure process is conducted. Thereafter, development is conducted by using a developer consisting of, for example, a 2.38% solution of NMD-3 (trade name) produced by Tokyo Ohka Kogyo Co., Ltd., to form a stripe-like resin layer (resist film) 41' on the surface of the glass substrate 3 as shown in FIG. 4C. The photomask 42 has transparent portions of a width $a_1$ and light shielding portions of a width $a_2$. The transparent portions are used for forming the regions A which are arranged as shown in FIG. 2, and the light shielding portions are used for forming the regions B. Preferably, the patterns of the photomask 42 may be changed in accordance with the size of pixels, and are not limited to those described above. In the example, the widths $a_1$ and $a_2$ are set to 105 μm, but are not limited to that value.

Figure 4D:
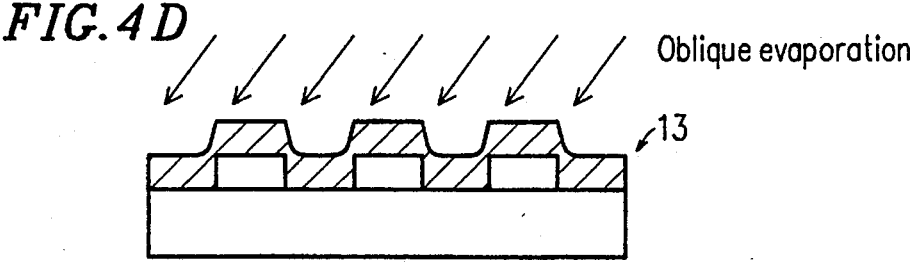

Then, as shown in FIG. 4D, vapor deposition is obliquely conducted onto the resin layer 41'. In the example, for example, tantalum oxide ($Ta_2O_5$) was deposited by an oblique evaporation in accordance with the method described in "Kogaku" vol. 19, p. 93 (1990) and under conditions listed in Table 1 below. Tantalum oxide $Ta_2O_5$ was deposited in the example. Alternatively, another oxide such as tin oxide, cerium oxide, zirconium oxide, bismuth oxide, titanium oxide, silicon oxide, or molybdenum oxide may be used.

TABLE 1

| Material | $Ta_2O_5$ |
|---|---|
| Evaporation Angle | 70 deg. |
| And | 140 nm |
| Thickness | 2 µm |

Figure 4E:
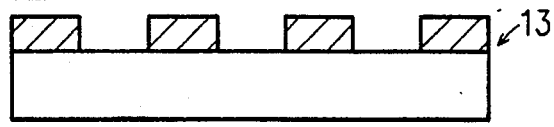

Next, as shown in FIG. 4E, the resin layer 41' functioning as a resist film was peeled off to form the first optical phase compensation member 13 into a stripe-like shape. In this formation, a so-called lift-off method was employed.

Figure 4F:
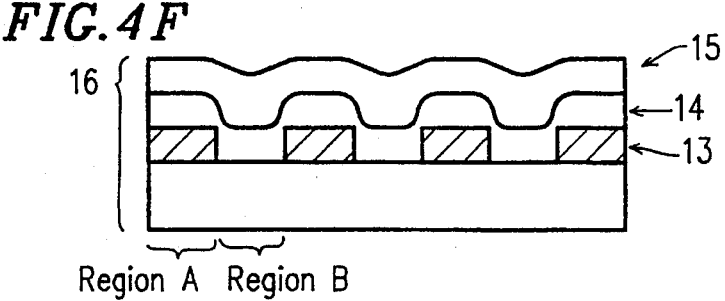

Next, as shown in FIG. 4F, the second optical phase compensation member 14 consisting of a stretched film made of polycarbonate and functioning as an optical phase compensation plate is disposed on the substrate. Then, the polarizer 15 having a transmittance of, for example, 48% which is measured when the polarizer is singly used is disposed on the substrate. In this way, the upper substrate 16 is produced.

FIGS. 5A to 5E are section views illustrating the processes of producing the lower substrate 8 shown in FIG. 1.

Figure 5A:
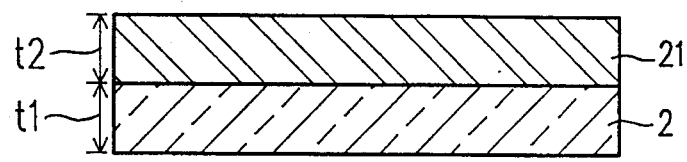
FIGS. 5A to 5E are section views illustrating the processes of producing a reflection plate of the liquid crystal display device shown in FIG. 1.

In the example, as shown in FIG. 5A, a glass substrate (trade name: 7059 produced by Corning Inc.) which has a thickness $t_1$ of, for example, 1.1 mm and was used as the glass substrate 2. A photosensitive material (such as OFPR800 (trade name) produced by Tokyo Ohka Kogyo Co., Ltd.) is spin-coated onto the glass substrate 2 at 500 to 3,000 r.p.m., to form a resin layer 21. In the example, the process of spincoating the photosensitive material is conducted at 2,500 r.p.m. for 30 sec., thereby forming the resin film 21 of a thickness $t_2$ of, for example, 1.5 µm.

Figure 5B:
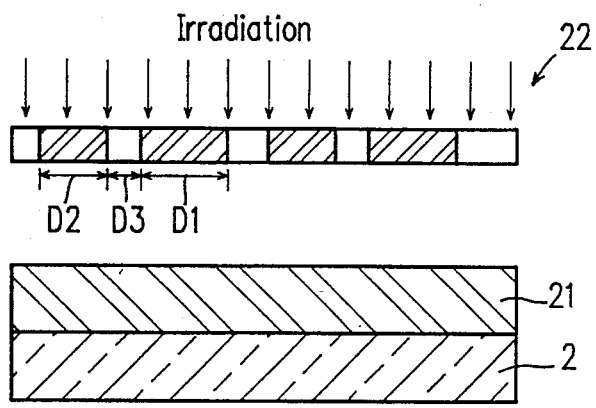
Figure 5C:
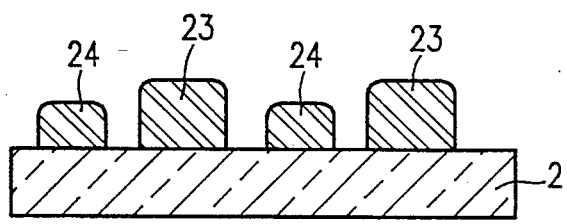

Next, the substrate on which the resin film 21 is formed is baked at a temperature of 90° C. for 30 min. Then, as shown in FIG. 5B, a photomask 22 in which a number of circular patterns of two kinds, large and small circular patterns described later are formed is placed and an exposure process is conducted. Thereafter, development is conducted by using a developer consisting of, for example, a 2.38% solution of NMD-3 (trade name) produced by Tokyo Ohka Kogyo Co., Ltd. to form large and small projections 23 and 24 having different heights on the surface of the glass substrate 2. The large and small projections 23 and 24 having different heights can be realized by controlling the exposure time and the developing time. The photomask 22 has a configuration in which circular light shielding portions are formed at random so as to obtain the arrangement of large and small projections 23 and 24 shown in FIG. 3. The diameter D1 of the light shielding portions for forming the large projections 23 is selected as, for example, 10 µm, the diameter D2 of the light shielding portions for forming the small projections 24 as, for example, 5 µm, and spaces D3 between the circles as at least 2 µm or longer.

Figure 5D:
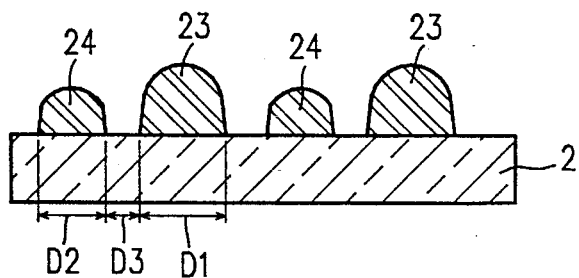

Next, the glass substrate 2 on which the large and small projections 23 and 24 are formed is heated at 200° C. for one hour so that the tops of the projections 23 and 24 are melted to some extent to be formed into an arcuate shape as shown in FIG. 5D, thereby forming the large and small projections 23 and 24.

Figure 5E:
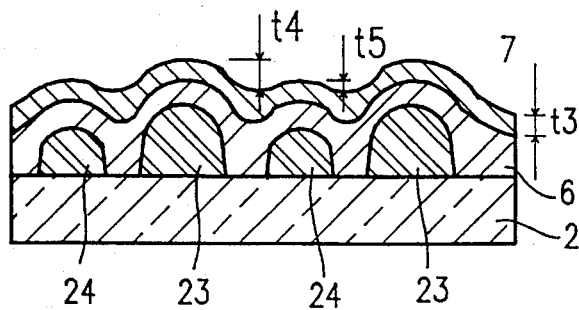

Then, as shown in FIG. 5E, a material which is the same as the above-mentioned photosensitive material is spin-coated onto the glass substrate 2 at 1,000 to 3,000 r.p.m. In the example, the spin coating is preferably conducted at 2,000 r.p.m. This causes the planarization film 6 to fill recesses formed between the projections 23 and 24 and be formed into a surface shape which is curved in a relatively gentle and smooth manner. In the example, the same resin as the above-mentioned photosensitive material is applied. Alternatively, a resin of another kind may be applied. The thickness $t_4$ of large smooth projections which are formed by the large projections 23 on the surface of the planarization film 6 was 0.7 µm, and the thickness $t_5$ of small smooth projections which are formed by the small projections 24 was 0.5 µm.

Next, a thin film of a metal such as aluminum, nickel, chromium, silver or gold is formed on the planarization film 6 so as to have a thickness $t_3$ of, for example, about 0.01 to 1.0 µm. In the example, aluminum is sputtered to form the reflection film 7. The reason why large and small projections 23 and 24 are formed under the reflection film 7 as described above is as follows: When the large and small projections 23 and 24 are formed at random in a plane and the heights of the projections 23 and 24 are changed, the surface of the reflection film 7 can be formed without any flat portions. This structure prevents light reflected from the reflection film 7 from causing an interference color, resulting in that an excellent white display is obtained. The pattern of the photomask 22 is not limited to the above.

The thus produced upper and lower substrates 16 and 8 are subjected to the following processes: First, alignment films 9 and 11 made of a polyimide resin film are coated on the upper and lower substrates 16 and 8, respectively, and the substrates are then baked at 220° C. for one hour. In the example, SUNEVER 150 (trade name) produced by Nissan Kagaku Kogyo was used as the material for the polyimide resin films.

Next, a rubbing process was conducted to align liquid crystal molecules of the liquid crystal layer 17, thereby completing the formation of the alignment films 9 and 11.

Thereafter, as the sealant 12 for sealing the space between the glass substrates 2 and 3 is applied by screen-printing, for example, an adhesive sealant into which spacers of a diameter of about 6 µm are dispersed.

When the thus formed lower and upper substrates 8 and 16 are to be stuck to each other, spacers of a diameter of 5.5 µm are sprayed on the glass substrate 2 so as to regulate the thickness of the liquid crystal layer. Then, the lower and upper substrates 8 and 16 are opposed to each other and attached to each other by the sealant 12. The liquid crystal is injected into the space between the lower and upper substrates 8 and 16 under vacuum and sealed to obtain the liquid crystal layer 17. In the example, a nematic liquid crystal (for example, ZLI4427 (trade name) produced by Merck & Co., Inc.) which is twisted by 240° C. deg. between the glass substrates 2 and 3 was used as the liquid crystal layer 17.

Figure 6:
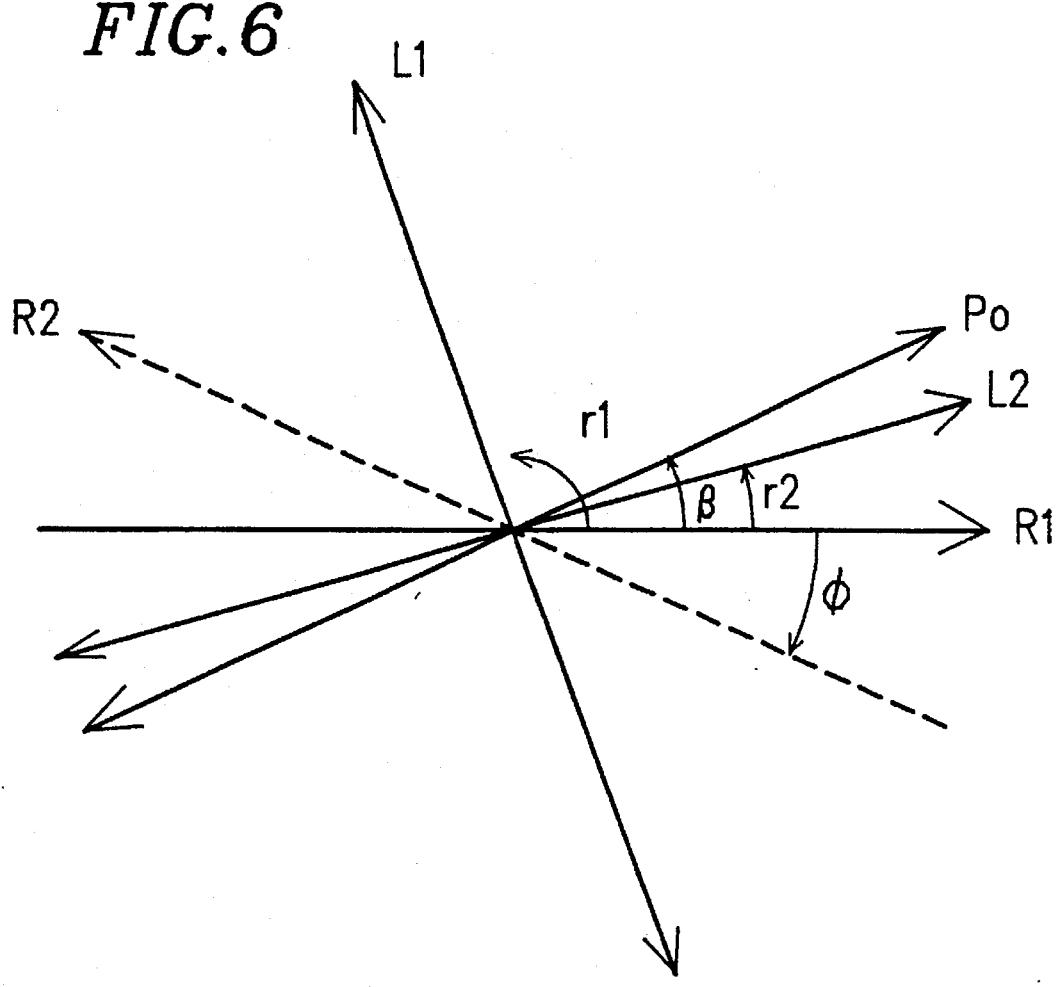
FIG. 6 is a diagram illustrating an optical configuration of the liquid crystal display device.

FIG. 6 is a diagram showing the optical configurations of the polarizer 15, the first and second optical phase compensation members 13 and 14, and the liquid crystal layer 17 of the thus produced liquid crystal display device. The alignment direction of liquid crystal molecules in the liquid crystal layer 17 in the side of the upper substrate 16 is indicated by R1. The angle in a counterclockwise direction which the direction PO of the absorption axis or transmission axis of the polarizer 15 forms with the alignment direction is indicated by β, that in a counterclockwise direction which the direction L1 of the slower optic axis of the first optical phase compensation member 13 forms with the alignment direction is indicated by τ1, and that in a counterclockwise direction which the direction L2 of the slower optic axis of the second optical phase compensation member 14 forms with the alignment direction is indicated by τ2. The twist angle between liquid crystal molecule R1 of the upper substrate 16 and liquid crystal molecules R2 of the lower substrate 8 is indicated by φ by setting the clockwise direction as positive.

The upper substrate 16 was produced while setting the retardation of the first optical phase compensation member 13 due to the oblique evaporation to 140 nm, and that of the second optical phase compensation member 14 due to the optical phase compensation plate to 500 nm. These angles were set as follows: β=−30°, τ1=−75°, and τ2=15°. As a result, different regions of Δnd wherein Δnd of the region A is 360 nm and Δnd of the region B is 500 nm was produced. The angle φ was set to 240 deg.

Figure 7:
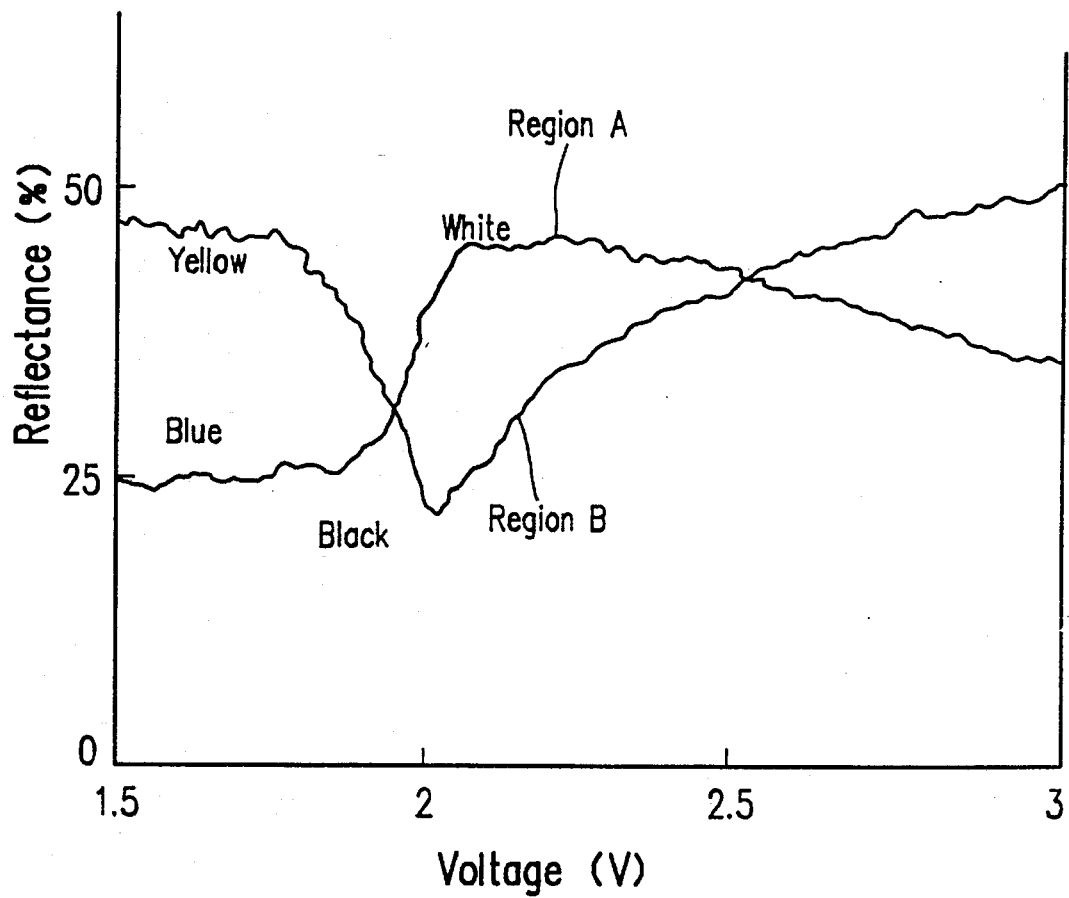
FIG. 7 is a graph showing the voltage-reflectance characteristics of the liquid crystal display device of Example 1.

FIG. 7 is a graph showing the voltage-reflectance characteristics of the liquid crystal display device of the example. As seen from the figure, according to the liquid crystal display device configured as described above, blue is satisfactorily shown in the region A, and yellow is satisfactorily shown in the region B. According to experiments conducted by the inventors, a satisfactory four-color display of blue, yellow, white and black was attained without parallax. Moreover, it was confirmed that a satisfactory display is attained also in other combinations of two colors, i.e., magenta and green, and cyan and red. In the other combinations, however, the retardations of the first and second optical phase compensation members 13 and 14, and the set angles β, τ1, and τ2 must be optimized. Furthermore, it was confirmed that, when three kinds of regions having different retardations are formed and the regions are set so as to respectively show colors of RGB, a multi-color display can be attained. When the optical phase compensation members are modified so as to have various retardations, moreover, it is possible to show various colors.

According to the experiments conducted on the liquid crystal display device of the example by the inventors, with respect to light entering at an angle inclined by 30° from the direction normal to the liquid crystal display device, the reflectance of white in the normal direction was about 45%. In the experiments, a standard white board of magnesium oxide (MgO) is used as a member which is the standard for measuring the reflectance.

In the example, a cell having a twist angle of 240 deg. was used as the liquid crystal layer 17. The invention is not limited to this, and a liquid crystal layer of any twist angle or of no-twist may be used in the invention as far as the retardation can be controlled by an electric field.

In the example, as shown in FIG. 4, the upper substrate 16 was subjected to the resist patterning and then to the oblique evaporation. Alternatively, the evaporation may first be conducted on the whole area of the substrate, and then the patterning may be conducted by an etching of a conventional photolithography process. Any other method such as that in which only the evaporation is conducted or only a film is used may be used in the example as far as it can form regions having different retardations.

EXAMPLE 2

The liquid crystal display device of the example is an active-matrix type display device.

Figure 16:
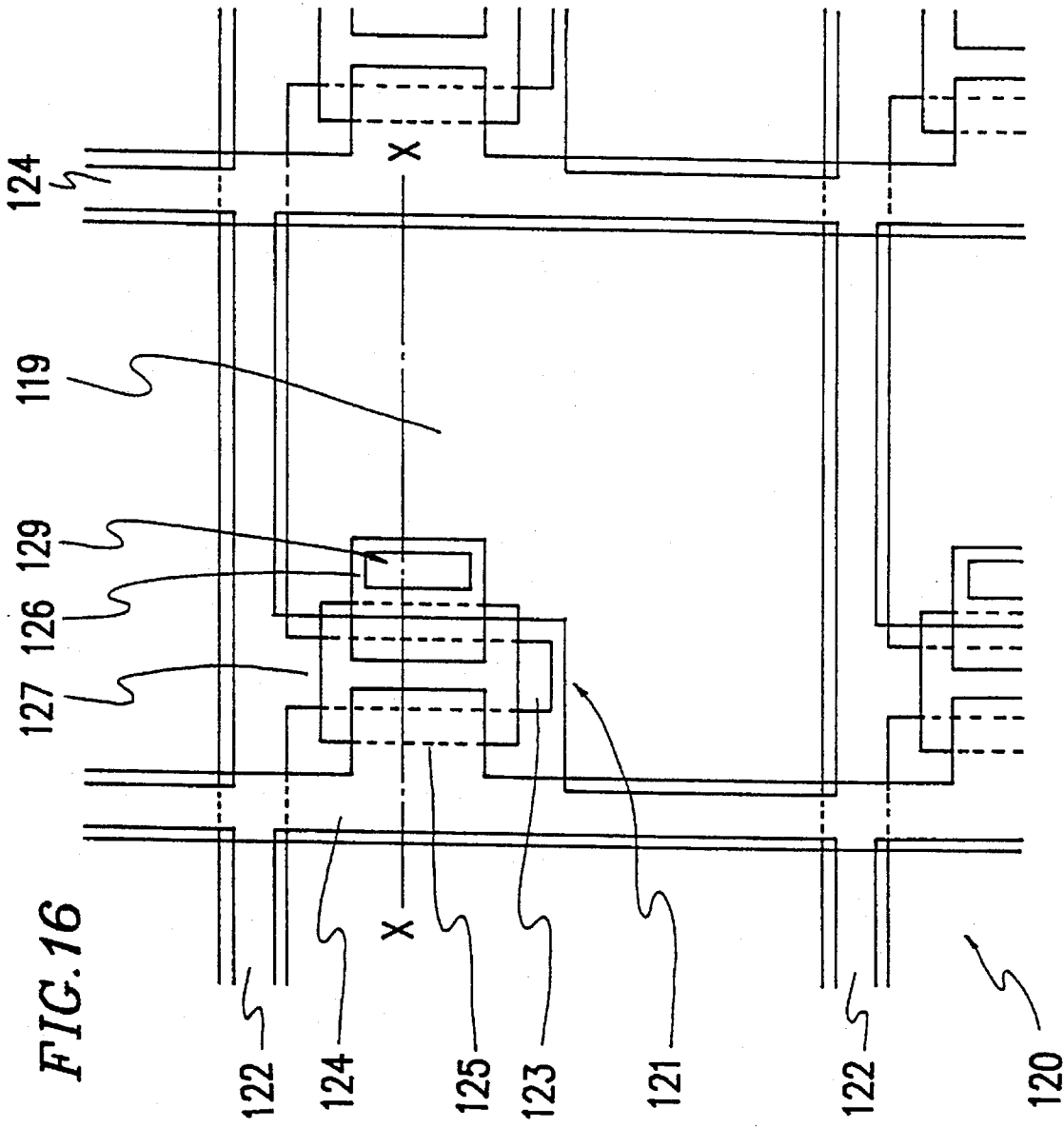
FIG. 16 is a plan view of a reflective active matrix substrate of liquid crystal display device of Example 2.
Figure 17:
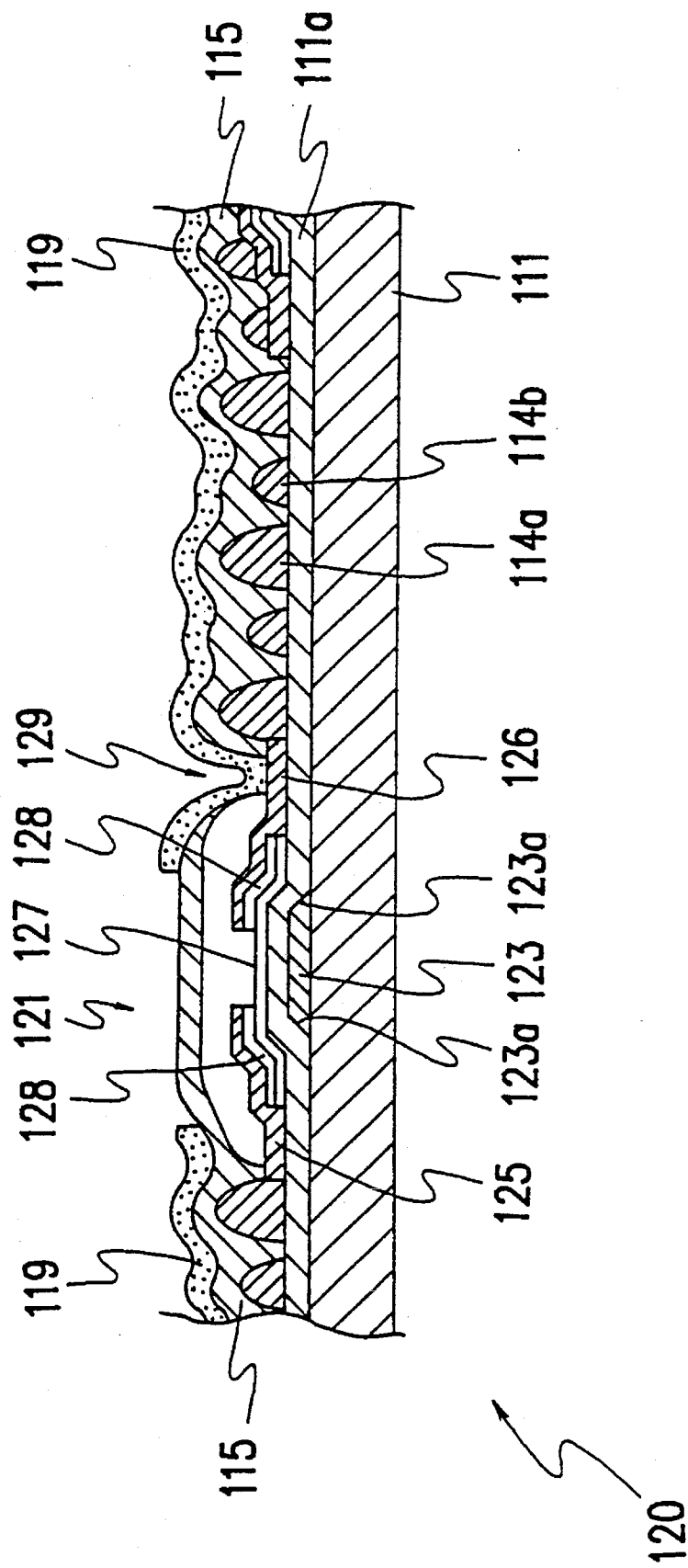
FIG. 17 is a cross-sectional view taken along a line X—X of FIG. 16.

FIG. 16 is a plan view showing an example of a reflective active matrix substrate 120. FIG. 17 is a cross-sectional view taken along a line X—X of FIG. 16. The reflective active matrix substrate 120 is used instead of the lower substrate 8 in Example 1. In the reflective active matrix substrate 120, a plurality of gate bus lines 122 (i.e., scanning lines) and a plurality of source bus lines 124 (i.e., signal lines) are provided on an insulating glass substrate 111 (i.e., a base substrate) so as to cross each other. In a rectangular region formed by each gate bus line 122 and each source bus line 124, a pixel electrode 119 having an optical reflection function is provided. At one corner of the rectangular region in which each pixel electrode 119 is formed, a gate electrode 123 is branched out from each gate bus line 122, and at the tip end portion of each gate electrode 123, a thin film transistor (TFT) 121 is formed as a switching element. The gate electrode 123 forms a part of the TFT 121.

Furthermore, at one corner of the rectangular region in which each pixel electrode 119 is formed, a source electrode 125 is branched out from each source bus line 124. The tip end portion of the source electrode 125 overlaps the gate electrode 123 in an insulating state. The source electrode 125 forms a part of the TFT 121. A drain electrode 126 of the TFT 121 is provided at a distance from the source electrode 125 and overlaps the gate electrode 123 in an insulated state. Each drain electrode 126 is electrically connected to each pixel electrode 119.

As shown in FIG. 17, the TFT 121 is provided above the gate electrode 123 formed on the glass substrate 111. The gate electrode 123 is covered with a gate insulating film 111a which is formed over the entire surface of the glass substrate 111. On a part of the gate insulating film 111a, a semiconductor layer 127 is formed so as to cover a region above the gate electrode 123. A pair of contact layers 128 are formed covering both ends of the semiconductor layer 127. The source electrode 125 is formed so as to cover one of the pair of contact layers 128 and the drain electrode 126 is formed so as to cover the other one of the pair of contact layers 128.

Below the pixel electrode 119 having the above-mentioned optical reflection function, projections 114a and 114b are alternately formed on the glass substrate 111. The height of the projections 114a is made larger than that of the projections 114b. A polymer resin film 115 is formed so as to cover the projections 114a and 114b. The upper surface of the polymer resin film 115 is in a wave shape because of the presence of the projections 114a and 114b. The polymer resin film 115 is formed over almost the entire surface of the glass substrate 111 as well as below the pixel electrode 119. The pixel electrode 119 is formed on the polymer resin film 115 with a surface in a continuous wave shape and is formed of, for example, Al which has an optical reflection function. The pixel electrode 119 is electrically connected to the drain electrode 126 via a contact hole 129.

The liquid crystal display device of the example is configured in the following manner. A liquid crystal of ZLI2459 (trade name) produced by Merck & Co., Inc. was used as the liquid crystal layer 17 in Example 1, the cell thickness was 5.5 μm, and the retardation was set to 605 nm. In the same method as that of Example 1, the retardation of the first optical phase compensation member 13 due to the oblique evaporation was set to 130 nm. Furthermore, a stretched film made of polycarbonate was used as the second optical phase compensation member 14, and the retardation of the stretched film was set to 130 nm. The angles according to the indication of FIG. 6 were set as follows: β=45°, τ₁=−45°, and τ₂=−45°.

Furthermore, the slower optic axis L1 of the first optical phase compensation member 13 is superposed on the slower optic axis L2 of the stretched film used as the second optical phase compensation member 14, and a region having a retardation of 260 nm was formed. The region A of FIG. 2 is a portion of the retardation of 260 nm, and the region B is a portion of the retardation of 130 nm. The twist angle φ was set to 0 deg.

Furthermore, a thin film transistor used as a switching element, or a nonlinear element having a MIM (metal-insulator-metal) structure was connected to the reflection film 7. The other configurations are the same as those of FIG. 1. The alignment films 9 and 11 were formed by using AL2061 (trade name) produced by Japan Synthetic Rubber Inc., and underwent a rubbing process to attain a homogeneous alignment.

Figure 8:
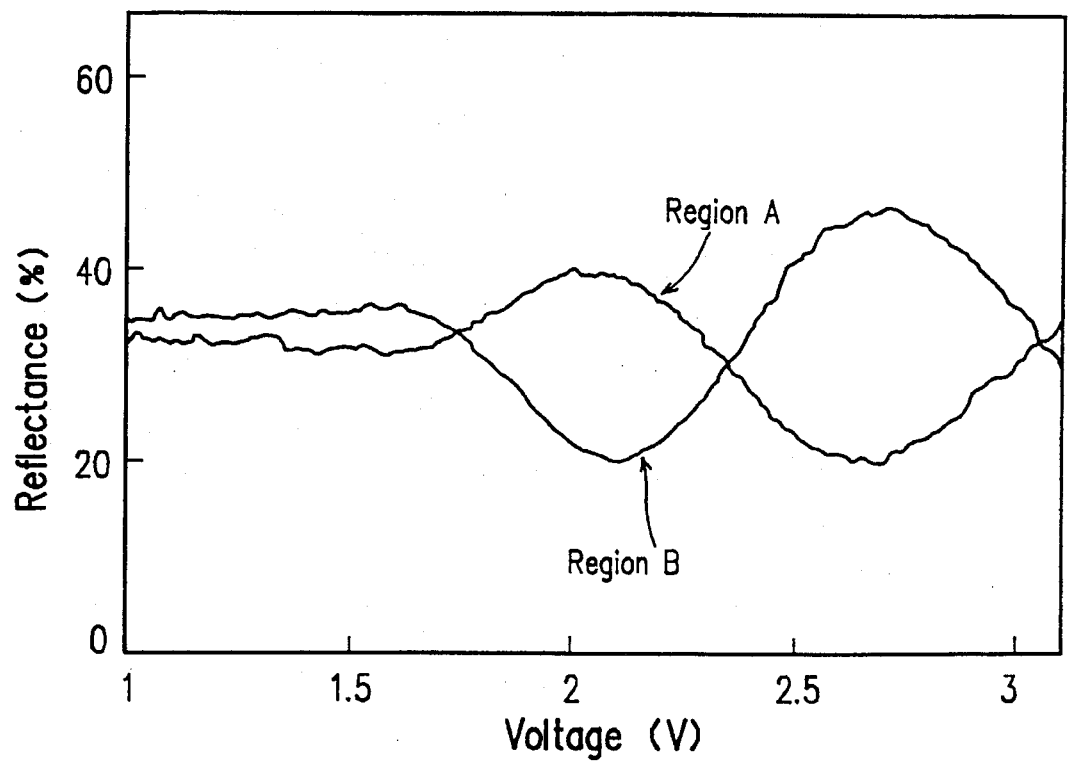
FIG. 8 is a graph showing the voltage-reflectance characteristics of a liquid crystal display device of Example 2.
Figure 9:
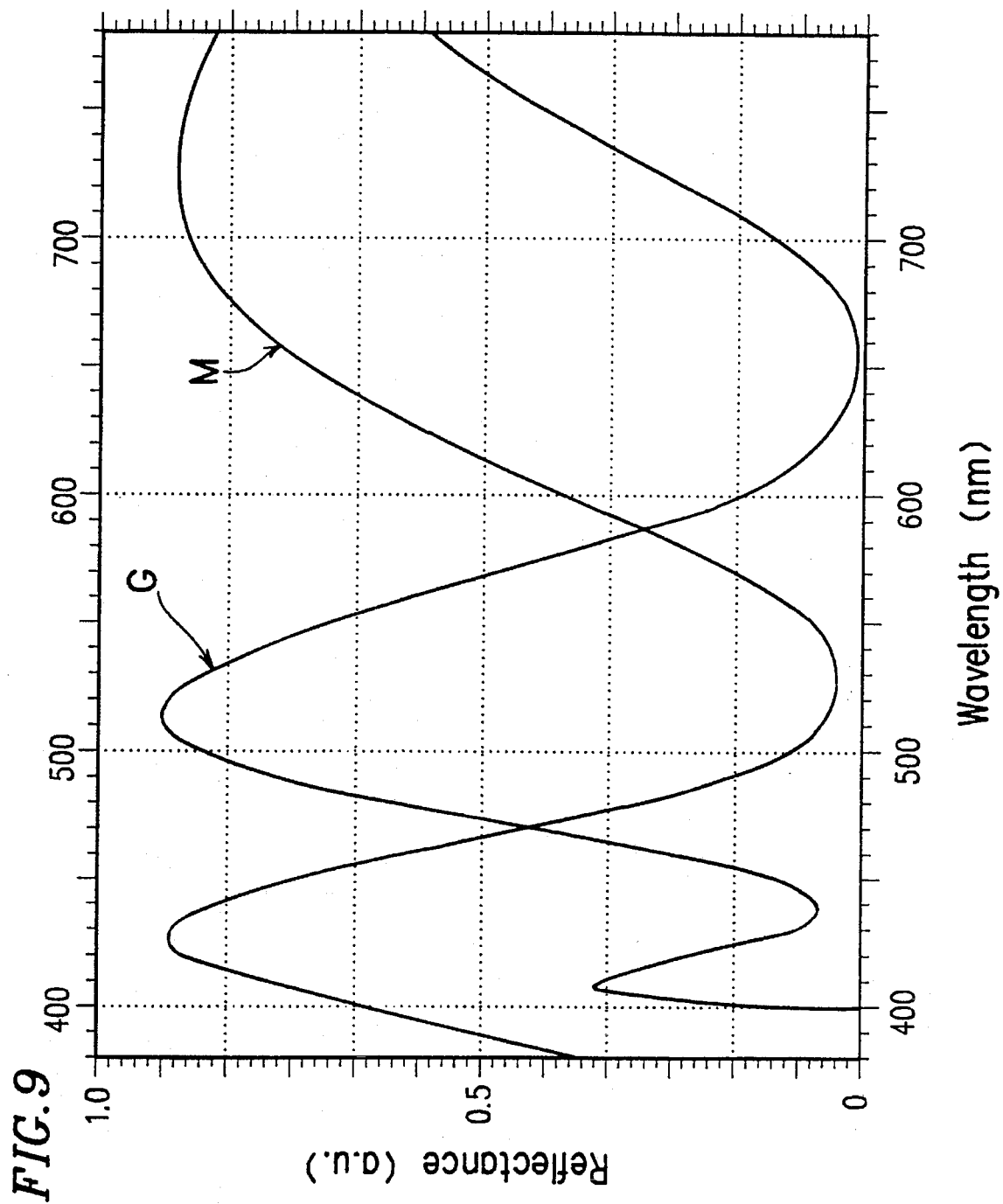
FIG. 9 is a graph showing the wavelength dependence of the reflected light intensity of the liquid crystal display device of Example 2 in which green and magenta are displayed.
Figure 10:
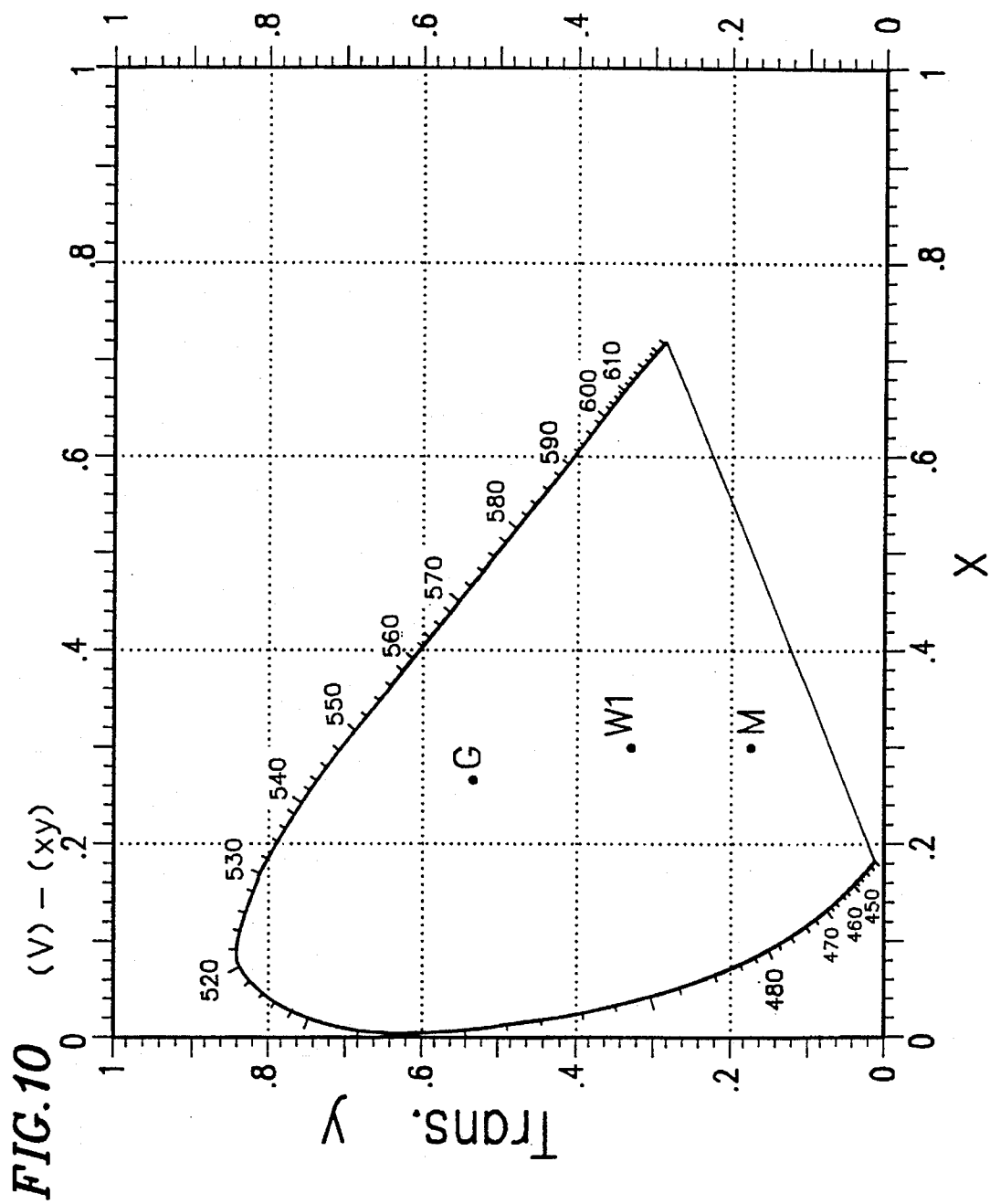
FIG. 10 is a chromaticity diagram of the liquid crystal display device of Example 2 in which green and magenta are displayed.

FIG. 8 is a graph showing the voltage-reflectance characteristics of the liquid crystal display device of Example 2. The measurements were conducted by the same method as that of Example 1. FIG. 9 is a graph showing the wavelength dependence of the reflectance obtained in the cases where green and magenta are shown. FIG. 10 shows a CIE chromaticity diagram of the device. In FIG. 10, point W1 indicates light of a white light source, points M and G indicate reflected light of magenta and that of green, respectively. It was confirmed that in the view point of color purity there is no obstacle in practical use.

As an example, the device may be set so that, when no voltage is applied, the region A shows magenta and the region B shows green. Under this configuration, by adequately combining the regions A and B in accordance with a voltage to be applied, for example, color displays listed in Table 2 below are made available.

layer 17 is sealed between the alignment films 9 and 11.

In the liquid crystal display device, when the polarization axis of the polarizer 15 disposed at the back (the lower side in the figure) is made perpendicular to that of the polarizer 15 disposed at the front (the upper side in the figure), the same colors as those obtained in Example 1 are shown. When the polarization axes of the two polarizers 15 are parallel to each other, complementary colors of the colors obtained in Example 1 are shown. It was confirmed that also in this case a satisfactory color display can be attained without using a color filter based on the same principle.

EXAMPLE 4

A still further example of the invention will be described. The liquid crystal display device of the example was configured in the following manner: A stretched film made of polycarbonate was used as the first optical phase compensation member 13 of the reflective liquid crystal display device described in conjunction with Example 1, and patterned by a dry etching technique using a conventional photoprocess. Then, a stretched film made of polycarbonate and functioning as the second optical phase compensation member 14 was disposed on the member 13. The other configurations were the same as those of Example 1.

It was confirmed that also the liquid crystal display device can conduct a satisfactory color display without using a color filter based on the same principle.

In the example, a stretched film made of polycarbonate was used. The invention is not limited to this. Alternatively, a stretched film made of polyvinyl alcohol (PVA) or polymethyl methacrylate (PMMA) may be used and patterned.

TABLE 2

| Region A | White | Magenta | Magenta | White | Black | Magenta | Black |
|---|---|---|---|---|---|---|---|
| Region B | White | White | Black | Green | Green | Green | Black |
| Display | White | Bright Magenta | Dark Magenta | Bright Green | Dark Green | Light Black | Black |

In the example, a pixel is divided into two regions of magenta and green. The manner of division is not limited to this, and a combination of yellow and blue or cyan and red may be employed. It was confirmed that, when a pixel is divided into three regions, or blue, red and green regions, reflected light showing colors of a further increased number of kinds can be obtained. Under these settings, arbitrary colors can be shown by adjusting the retardation of the liquid crystal layer and that of the optical phase compensation plate.

In the liquid crystal display device of the example, the display hue can be modulated by a voltage using two pixels. Therefore, the reduction of resolution which is observed in a conventional system realized by combining RGB color filters is small, with the result that the brightness is almost doubled.

EXAMPLE 3

Figure 11:
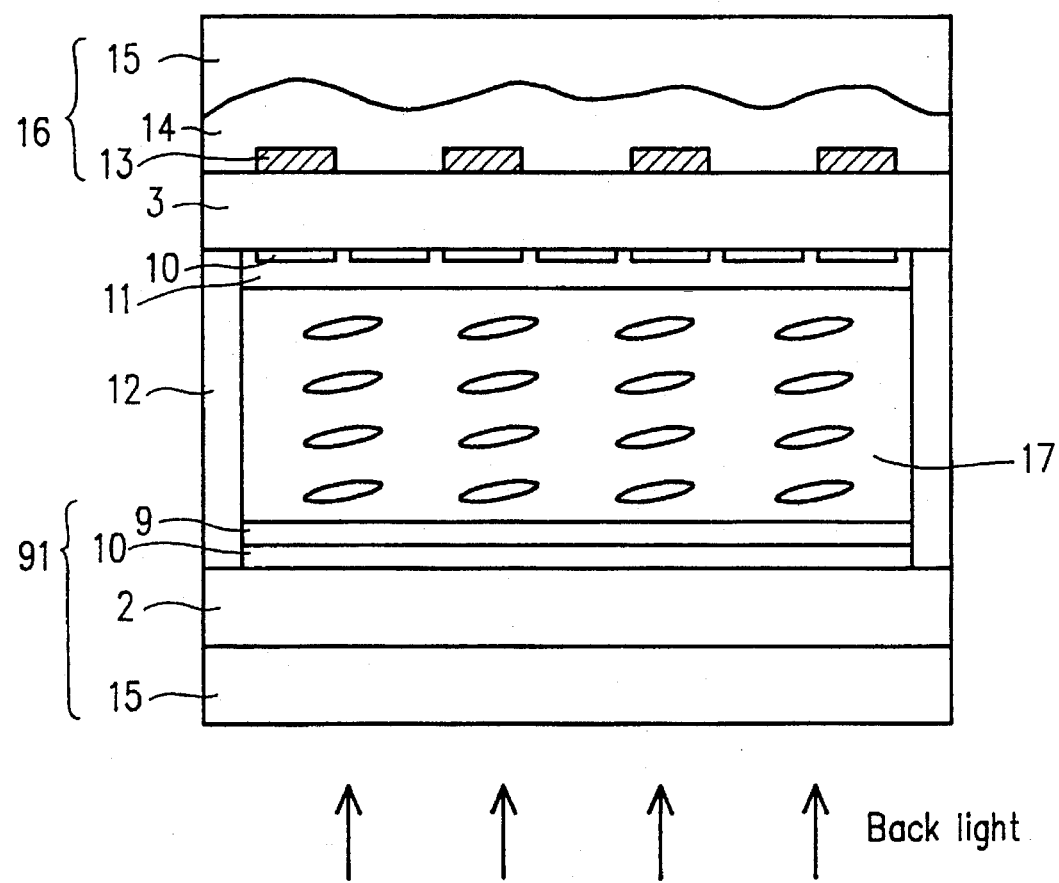
FIG. 11 is a section view of a liquid crystal display device of Example 3.
Figure 12:
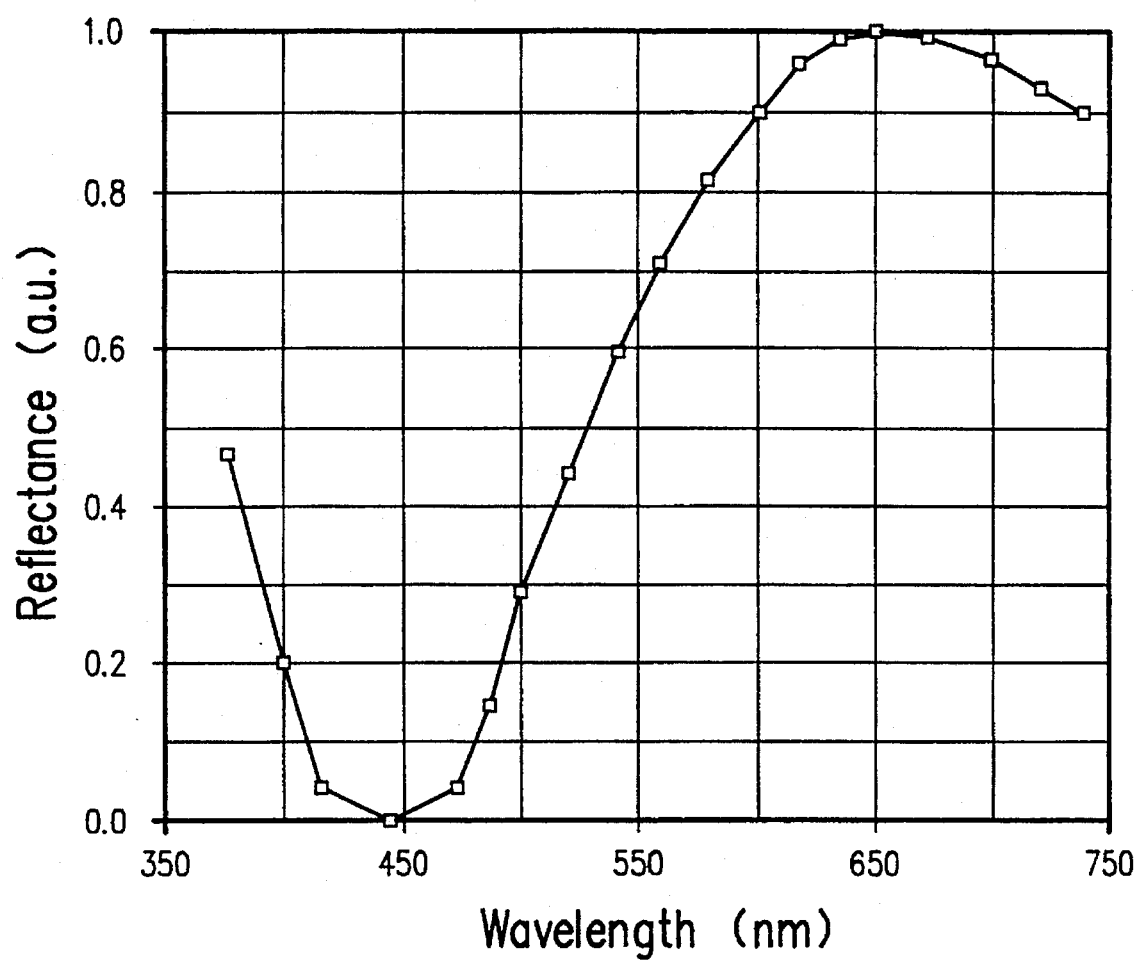
FIG. 12 is a graph showing the wavelength dependence of the reflected light intensity.
Figure 13:
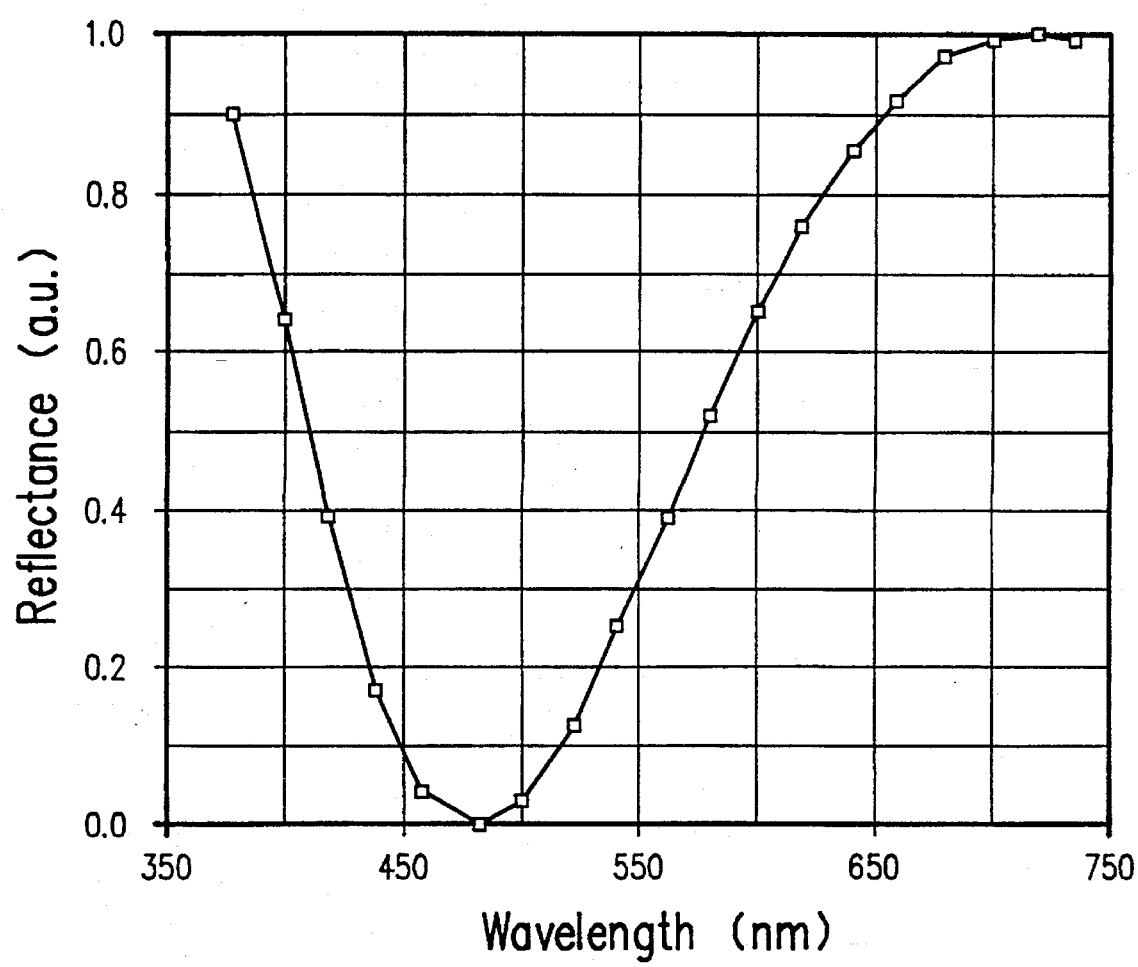
FIG. 13 is a graph showing the wavelength dependence of the reflected light intensity.
Figure 14:
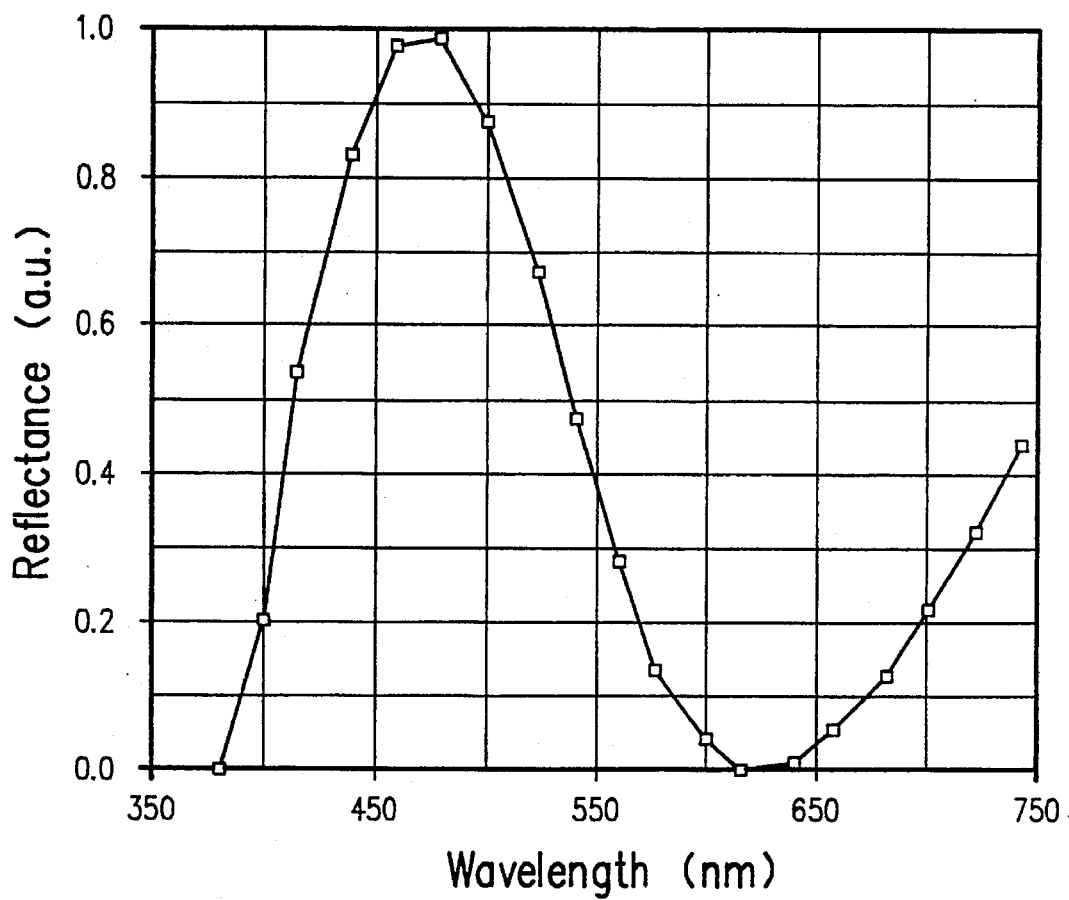
FIG. 14 is a graph showing the wavelength dependence of the reflected light intensity.
Figure 15:
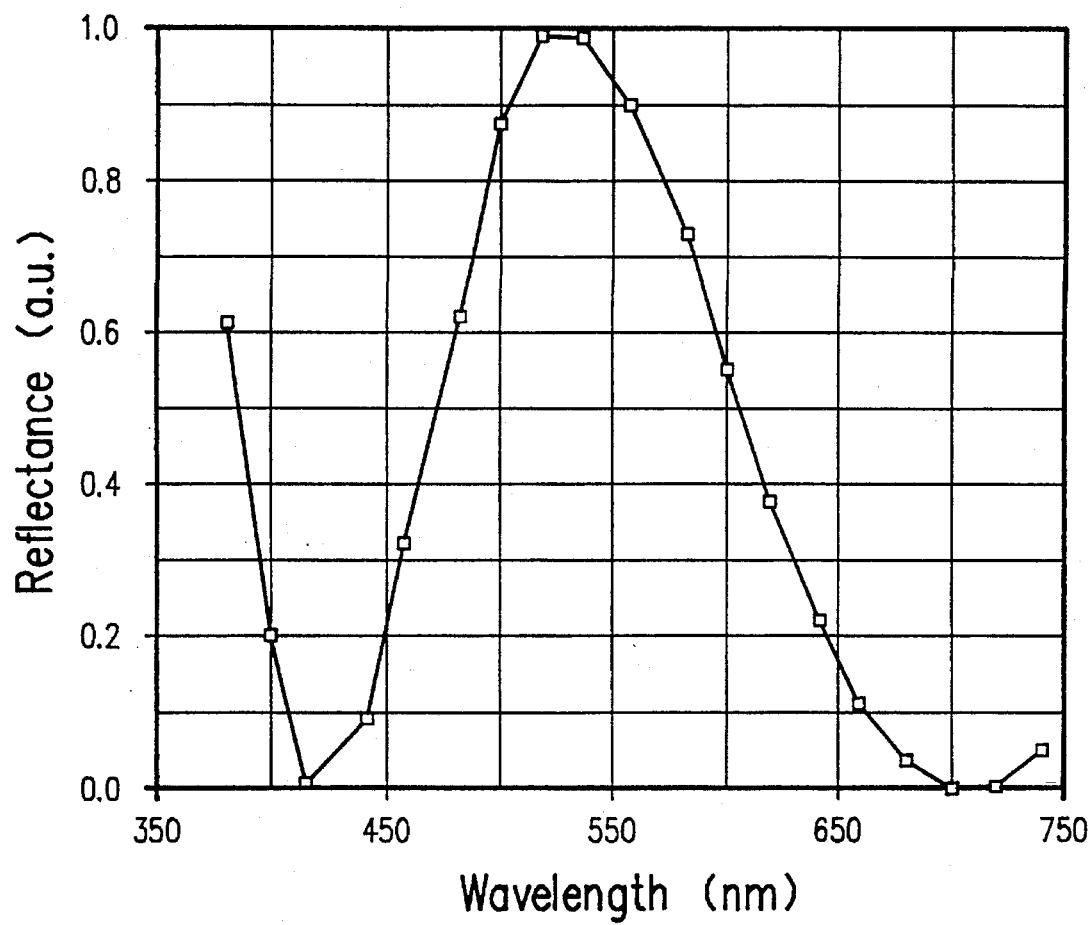
FIG. 15 is a graph showing the wavelength dependence of the reflected light intensity.

A further example of the invention will be described. FIG. 11 is a section view showing a liquid crystal display device of the example. In place of the lower substrate 8 of the reflective liquid crystal display device described in conjunction with Example 1, a transparent substrate 91 in which the transparent electrode 10 and the alignment film 9 are formed on the glass substrate 2 is used. The polarizer 15 is disposed on the back of the transparent substrate 91. The liquid crystal A stretched film having photosensitivity may be used. In this case, there is a merit that the process is simplified. It was confirmed that also in this case a satisfactory color display can be attained without using a color filter based on the same principle. Furthermore, it was confirmed that a patterning can be conducted in the same manner also by using a wet etching technique in place of a dry etching technique.

In Examples 1 to 4 described above, the liquid crystal layer in which liquid crystal molecules are oriented in parallel to the substrate or twisted by 240 deg. is used. The invention is not limited to these orientations of the liquid crystal molecules. The liquid crystal layer of which the twist angle is between 0 to 300 deg. may be used in the liquid crystal display device of the present invention. The liquid crystal layer in which the liquid crystal molecules on a substrate are oriented in a substantially perpendicular direction may be used. When a nematic liquid crystal having negative anisotropy of dielectric constant is used, for example, the liquid crystal layer in which the liquid crystal molecules at both substrates are perpendicularly oriented can be used in the invention. Liquid crystal layers having any orientation may be used in the present invention as far as the retardation of the liquid crystal layer can be controlled by an electric field.

A liquid crystal layer of retardation of 1.0 μm or less may be used in the invention. It was confirmed that in this case the viewing angle is wide and the color purity is high.

In Examples 1 to 4 described above, a stretched film made of polycarbonate is used as the second optical phase compensation member 14. The invention is not limited to this, and a stretched film of PVA, PMMA or the like may be used. The second optical phase compensation member 14 may be formed by oblique evaporation.

In Examples 1 to 4 described above, the optical phase compensation members have two kinds of retardations. The invention is not limited to this. Optical phase compensation members having three or more kinds of retardations may be employed in the present invention. The device according to the invention may be so configured that portions of three or more different retardations exist in one pixel. Alternatively, the device may be so configured that some portions of two or more different retardations exist in one pixel and the other portions exist in another pixel.

In Examples 1 to 3 described above, the first optical phase compensation member 13 is disposed outside the liquid crystal cell. The first optical phase compensation member 13 may be disposed inside the liquid crystal cell. Also in this case, the same effects can be attained.

In place of the glass substrate 2 used in Examples 1 to 4, an opaque substrate such as a silicon substrate may be used. It was confirmed that also in this case the same effects can be attained. In this case, there is an advantage that circuit elements can be integrated on the substrate.

As described above, according to the invention, light passing through the polarizers, the optical phase compensation members and the liquid crystal layer is emitted as elliptically polarized light to show a specific color, the hue of the emitted light can be controlled by adjusting $(\Delta n_1 d_1 - \Delta n_2 d_2)/\lambda$ in Eqs. (2) to (4) by means of an electric field applied to the liquid crystal layer. Therefore, emitted light can be formed so as to have hues of two more kinds in accordance with a pixel, whereby a multicolor display can be attained without using a color filter.

When the invention is applied to a reflective display device, particularly, a light reflection member can be formed inside a liquid crystal element so that the parallax is eliminated and a reflective color liquid crystal display device of high definition and high display quality can be realized. When the color liquid crystal display mode of the invention is used, the face on which a reflection film is formed can be disposed in the side of a liquid crystal layer, and therefore the parallax is eliminated, thereby obtaining a satisfactory display image.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device providing enhanced color display, comprising: a first substrate and a second substrate; a liquid crystal layer sandwiched between said first and said second substrates; electrodes attached to said first and second substrates for applying an electric filed to said liquid crystal layer to control a retardation of said liquid crystal layer; and at least one polarizer disposed outside of said first substrate; wherein said first substrate positioned between said polarizer and said liquid crystal layer comprises an optical phase compensation means which includes at least two optical compensation members, at least one of said optical compensation members overlapping another of said optical compensation members so as to form at least a first region having a first retardation and a second region having a second retardation different from the first retardation, whereby a color of emitted light from each of said first and said second regions is selected to be a specific one, in accordance with said retardations of said optical phase compensation means and said retardation of said liquid crystal layer.

2. A device according to claim 1, wherein each of a plurality of pixels displayed by said device includes a portion of one of said first and said second regions.

3. A device according to claim 1, wherein each of a plurality of pixels displayed by said device includes each portion of said first and second regions.

4. A device according to claim 3, wherein said optical phase compensation means further comprises a third region having a third retardation, and each of said plurality of pixels includes a portion of at least one of said first, said second and said third regions.

5. A device according to claim 1, wherein said first and said second regions are arranged regularly in two dimensions.

6. A device according to claim 1, wherein said retardation of said liquid crystal layer is equal to or less than 1.0 μm.

7. A device according to claim 1, wherein said second substrate comprises a light reflecting means on a side of said liquid crystal layer.

8. A device according to claim 6, wherein said light reflecting means functions as one of said electrodes for applying an electric field to said liquid crystal layer.

9. A device according to claim 1, wherein a first one of said optical compensation members includes a plurality of elongated strips spaced from one another in a direction along said first substrate.

10. A device according to claim 1, wherein a first one of said optical compensation members includes an obliquely evaporated oxide film.

11. A device according to claim 1, wherein said oxide film is one of tantalum oxide, tin oxide, cerium oxide, zirconium oxide, bismuth oxide, titanium oxide, silicon oxide, and molybdenum oxide.

12. A device according to claim 1, wherein one of said optical compensation members consists of a stretched polymer film.

13. A device according to claim 1, including exactly one polarizer disposed outside of said first substrate.

* * * * *